(12) United States Patent
Takahashi et al.

(10) Patent No.: US 8,313,256 B2
(45) Date of Patent: Nov. 20, 2012

(54) FOCAL PLANE SHUTTER AND OPTICAL DEVICE

(75) Inventors: Hiroshi Takahashi, Chiba (JP); Seiichi Oishi, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/234,307

(22) Filed: Sep. 16, 2011

(65) Prior Publication Data

US 2012/0008932 A1    Jan. 12, 2012

Related U.S. Application Data

(63) Continuation of application No. PCT/JP2011/050133, filed on Jan. 6, 2011.

(30) Foreign Application Priority Data

Feb. 22, 2010    (JP) ................................ 2010-035697

(51) Int. Cl.
    *G03B 9/08*    (2006.01)

(52) U.S. Cl. ....................................... 396/463

(58) Field of Classification Search ............. 396/483, 396/463
    See application file for complete search history.

(56) References Cited

U.S. PATENT DOCUMENTS

| | | | |
|---|---|---|---|
| 5,239,325 A | * | 8/1993 | Fukuda ............ 396/465 |
| 2007/0237518 A1 | * | 10/2007 | Ichihara et al. ............ 396/466 |

FOREIGN PATENT DOCUMENTS

| | | |
|---|---|---|
| JP | 6-26211 | 4/1994 |
| JP | 2004-29277 A1 | 1/2004 |
| JP | 2007-232889 A1 | 9/2007 |
| JP | 2007-293293 A1 | 11/2007 |
| JP | 2008-175254 A1 | 7/2008 |

OTHER PUBLICATIONS

International Search Report for International Application No. PCT/JP2011/050133 dated Mar. 4, 2011.

* cited by examiner

*Primary Examiner* — Christopher Mahoney
*Assistant Examiner* — Fang-Chi Chang
(74) *Attorney, Agent, or Firm* — Kratz, Quintos & Hanson, LLP

(57) ABSTRACT

A focal plane shutter includes: an electromagnet; a board including an opening; a blade movable between a position where the blade recedes from the opening and a position where the blade covers at least part of the opening; and a drive lever driving the blade, and including: a spindle portion provided at its one end with a flange portion; an iron piece provided at the other end of the spindle portion and capable of being adsorbed to the electromagnet; a support portion including a through hole through which the spindle portion penetrates with a play; and a guide portion provided along the iron piece.

4 Claims, 9 Drawing Sheets

FOCAL PLANE SHUTTER AND OPTICAL DEVICE

CROSS-REFERENCE TO RELATED APPLICATION

This application is a continuation of and claims priority to International Patent Application No. PCT/JP2011050133 filed on Jan. 6, 2011, which claims priority to Japanese Patent Application No. 2010-035697 filed on Feb. 22, 2010, subject matter of these patent documents is incorporated by reference herein in its entirety.

BACKGROUND (i) Technical Field

The present invention relates to focal plane shutters and optical device.

(ii) Related Art

A focal plane shutter includes: an electromagnet; and a drive lever holding an iron piece, the magnetic attraction force being generated between the iron piece and the electromagnet. The drive lever drives blades. The drive lever is biased by a biasing member such that the iron piece is moved away from the electromagnet. The energization of the electromagnet is stopped in a state where the iron piece is adsorbed to the electromagnet, thereby moving the drive lever in accordance with the biasing force of the biasing member such that the iron piece is moved away from the electromagnet. The drive lever drives the blades by use of the magnetic attraction force of the electromagnet and the biasing force of the biasing member.

When the reciprocation of the drive lever is repeated for a short period, the posture of the iron piece might not be maintained constant. The variation in the posture of the iron piece occurs, whereby the variation in the posture of the iron piece also occurs when the iron piece abuts the electromagnet. This might make the variation in the timing when the iron piece is moved away from the electromagnet after the energization of the electromagnet is stopped.

SUMMARY

It is therefore an object of the present invention to provide a focal plane shutter and an optical device that maintain the posture of an iron piece constant.

According to an aspect of the present invention, there is provided a focal plane shutter including: an electromagnet; a board including an opening; a blade movable between a position where the blade recedes from the opening and a position where the blade covers at least part of the opening; and a drive lever driving the blade, and including: a spindle portion provided at its one end with a flange portion; an iron piece provided at the other end of the spindle portion and capable of being adsorbed to the electromagnet; a support portion including a through hole through which the spindle portion penetrates with a play; and a guide portion provided along the iron piece, wherein the drive lever includes: a first biasing member biasing the iron piece in an axial direction of the spindle portion; and a second biasing member biasing the iron piece in a direction intersecting the axial direction such that the iron piece is urged against the guide portion.

DETAILED DESCRIPTION

Figure 1:
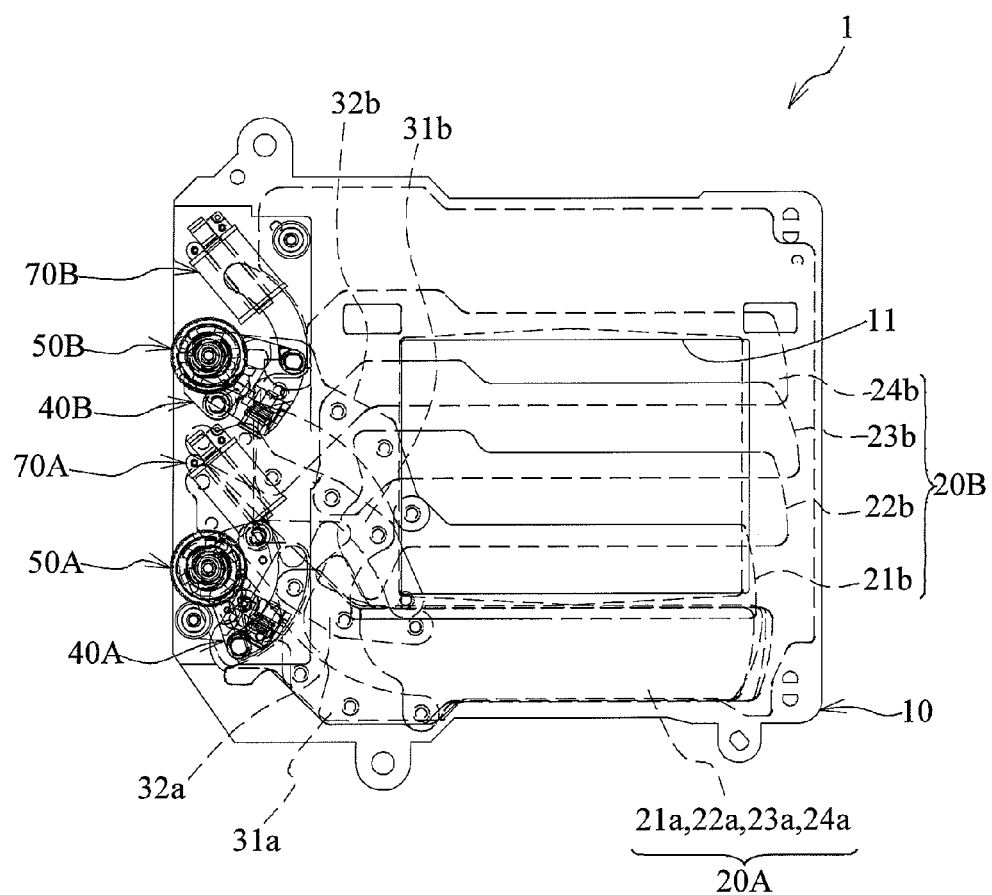
FIG. 1 is a front view of a focal plane shutter according to the present embodiment.

An embodiment will be described with reference to the drawings as follows. In the present embodiment, a focal plane shutter will be described as an example of a blade drive device. FIG. 1 is a front view of a focal plane shutter according to the present embodiment. As illustrated in FIG. 1, a focal plane shutter 1 includes: a board 10; blades 21a to 24a and 21b to 24b; drive arms 31a, 32a, 31b, and 32b; and electromagnets 70A and 70B. The board 10 is made of a synthetic resin, and includes an opening 11 with a rectangular shape. Each of the blades 21a to 24a and 21b to 24b is made of a synthetic resin and is thinly formed. Also, each of the drive arms 31a, 32a, 31b, and 32b is made of a metal sheet to retain its strength. Each of the blades 21a to 24a and 21b to 24b move between a position of receding from the opening 11 and a position of covering at least part of the opening 11.

Four blades 21a to 24a configure leading blades 20A. Four blades 21b to 24b configure trailing blades 20B. FIG. 1 illustrates the leading blades 20A in an overlapped state and the trailing blades 20B in an expanded state. In FIG. 1, the leading blades 20A recedes from the opening 11 and the trailing blades 20B close the opening 11.

The leading blades 20A are connected to the drive arms 31a and 32a. The trailing blades 20B are connected to the drive arms 31b and 32b. These drive arms 31a, 32a, 31b, and 32b are swingably supported by the board 10.

A leading blades-drive lever 40A and a trailing blades-drive lever 40B for respectively driving the drive arms 31a and 32b are provided in the board 10. The leading blades-drive lever 40A and the trailing blades-drive lever 40B are supported by the board 10 to be swingable in a predetermined range. Specifically, the leading blades-drive lever 40A is supported to swing about a spindle provided in the board 10. The swinging range of the leading blades-drive lever 40A is limited by a rubber, mentioned later, provided at an end portion of a slot formed in the board 10. This is applied to the trailing blades driving lever 40B.

The drive arm 31a is connected to the leading blades-drive lever 40A. The drive arm 32b is connected to the trailing blades-drive lever 40B. The swinging of the leading blades-drive lever 40A causes the drive arm 31a to swing, thereby moving the leading blades 20A. Likewise, the swinging of the trailing blades-drive lever 40B causes the drive arm 32b to swing, thereby moving the trailing blades 20B.

The leading blades-drive lever 40A and the trailing blades-drive lever 40B each holds an iron piece which does not have a reference numeral. The leading blades-drive lever 40A can swing between the position where the iron piece abuts the electromagnet 70A and the position where the iron piece recedes from the electromagnet 70A. This is applied to the trailing blades-drive lever 40B.

Also, the leading blades-drive lever 40A is biased by a spring, not illustrated, in such a direction as to move away from the electromagnet 70A. Likewise, the trailing blades-drive lever 40B is biased by a spring, not illustrated, in such a direction as to move away from the electromagnet 70B.

Ratchet wheels 50A and 50B engage the leading blades-drive lever 40A and the trailing blades-drive lever 40B, respectively, through the springs mentioned above. One end of the spring, which biases the leading blades-drive lever 40A in such a direction as to move away from the electromagnet 70A, engages the ratchet wheel 50A. The other end of the spring engages the leading blades-drive lever 40A. The rotational amount of the ratchet wheel 50A is adjusted, thereby adjusting the biasing force of the spring. The ratchet wheel 50B also has a function similar to that of the ratchet wheel 50A.

The electromagnet 70A is energized, thereby adsorbing the iron piece of the leading blades-drive lever 40A. Likewise, the electromagnet 70B is energized, thereby adsorbing the iron piece of the trailing blades-drive lever 40B.

Figure 2:
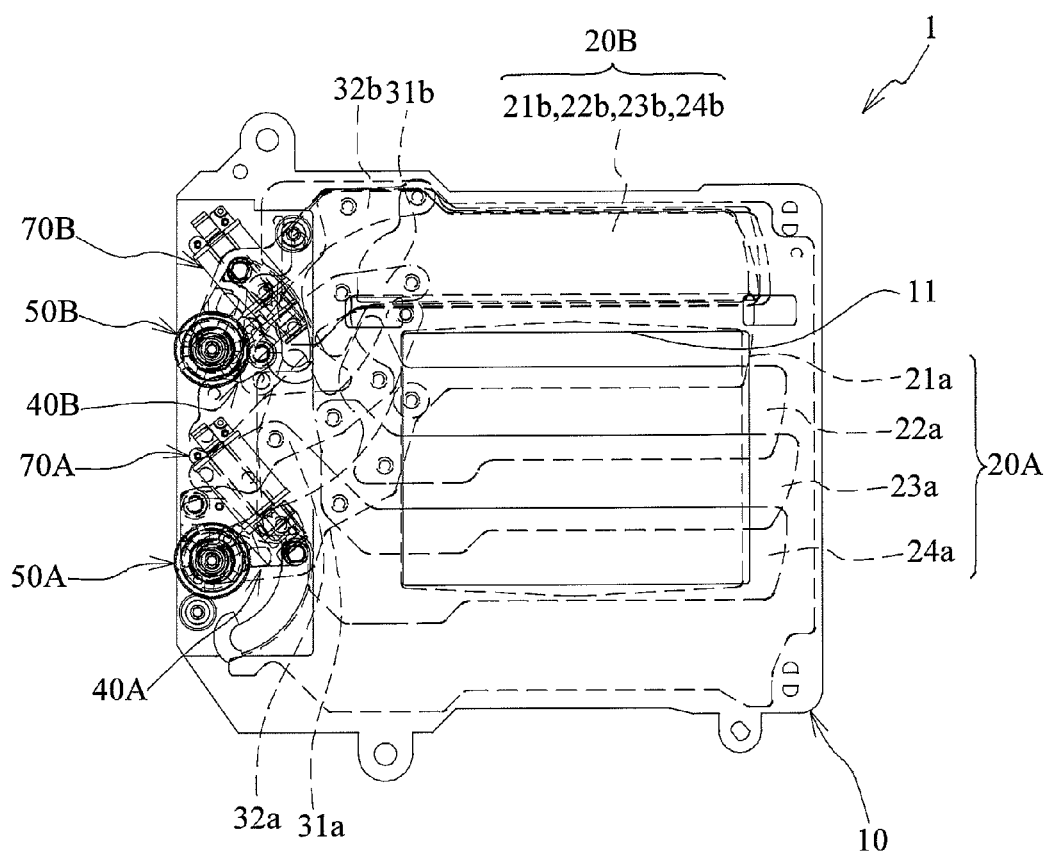
FIG. 2 is an explanatory view of an operation of the focal plane shutter.
Figure 3:
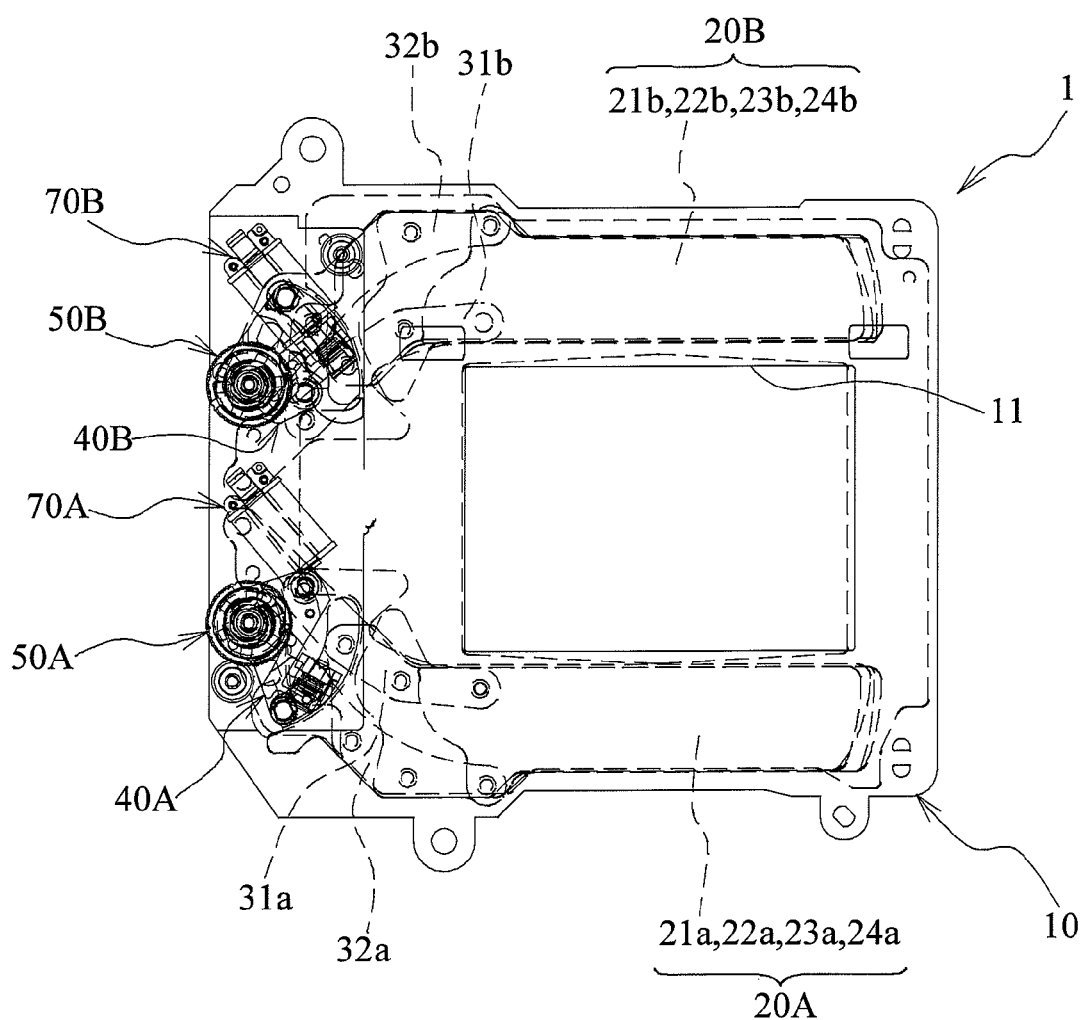
FIG. 3 is an explanatory view of the operation of the focal plane shutter.

Next, the operation of the focal plane shutter 1 will be described. FIGS. 1 to 3 are explanatory views of the operation of the focal plane shutter 1. Here, FIG. 2 illustrates the focal plane shutter 1 in an initial state. In this initial state, a set lever not illustrated is secured to an initial position, the leading blades 20A are expanded to close the opening 11, and the trailing blades 20B are overlapped each other to recede from the opening 11. In this initial state, the iron pieces of the leading blades-drive lever 40A and the trailing blades-drive lever 40B abut the electromagnets 70A and 70B respectively, and are set in such an initial position as to be adsorbed to them respectively.

In shooting, a release button of the camera is pushed to energize coils of the electromagnets 70A and 70B, whereby the iron piece of the leading blades-drive lever 40A is adsorbed to the electromagnet 70A and the iron piece of the trailing blades-drive lever 40B is adsorbed to the electromagnet 70B. After that, the set lever moves away from the leading blades-drive lever 40A and the trailing blades-drive lever 40B. At this time, the leading blades drive lever 40A and the trailing blades-drive lever 40B remain adsorbed to the electromagnets 70A and 70B, respectively.

Afterward, the energization of the coil of the electromagnet 70A is stopped, thereby rotating the leading blades-drive lever 40A in a clockwise direction by the biasing force of the spring as illustrated in FIG. 3. Therefore, the leading blades 20A move away from the opening 11 to be in the overlapped state. Also, the energization of the coil of the electromagnet 70B remains for a predetermined period, whereas the trailing blades 20B remain away from the opening 11. This causes the opening 11 to be in an opened state. FIG. 3 illustrates an exposed state.

After a predetermined period lapses from a time when the release button is pushed, the energization of the coil of the electromagnet 70B is stopped, and then the trailing blades-drive lever 40B rotates clockwise by the biasing force of the spring. Therefore, the trailing blades 20B are expanded to close the opening 11. The trailing blades-drive lever 40B abuts a rubber, as will be mentioned later, for preventing bound, provided at an end of the slot formed in the board 10. FIG. 1 illustrates the state just after the exposure operation is finished. In such a way, one cycle of shooting is finished.

Next, the leading blades-drive lever 40A and the trailing blades-drive lever 40B are rotated counterclockwise by the set lever not illustrated. Therefore, the leading blades 20A are expanded to close the opening 11 and the trailing blades 20B are overlapped each other to recede from the opening 11, whereby the state is returned to the initial state illustrated in FIG. 2.

Figure 4:
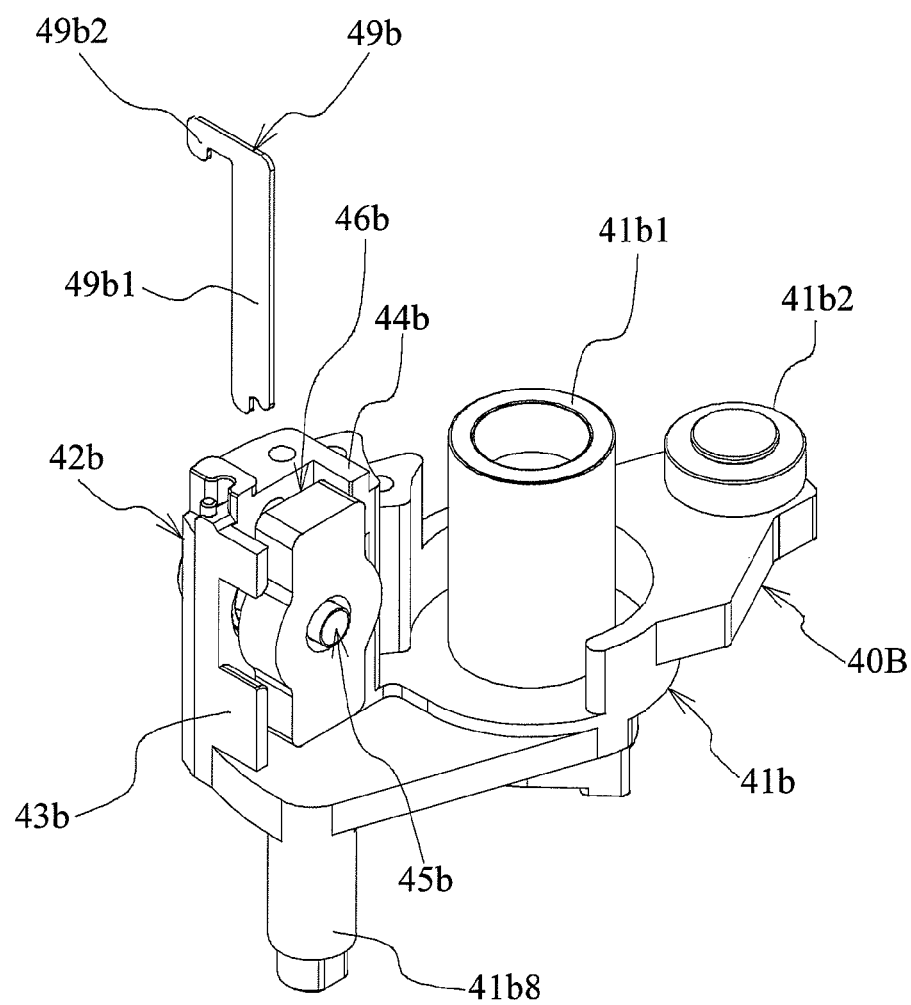
FIG. 4 is a perspective view of a trailing blades-drive lever.

Next, the drive lever will be described. Although the leading blades-drive lever 40A and the trailing blades-drive lever 40B differ in shape from each other, they substantially have the same configuration and the same parts. The following description will be given of only the trailing blades-drive lever 40B. FIG. 4 is a perspective view of the trailing blades-drive lever 40B. Firstly, an outline of the trailing blades-drive lever 40B will be described. Additionally, the structure is partially omitted in FIG. 4.

The trailing blades-drive lever 40B includes: a base portion 41b with a board shape; a cylindrical portion 41b1 standing on the base portion 41b; a roller portion 41b2; and a drive pin 41b8. The ratchet wheel 50B and a spring biasing the trailing blades-drive lever 40B are arranged around the cylindrical portion 41b1. Also, a spindle provided on the board 10 is fitted into the cylindrical portion 41b1. The trailing blades-drive lever 40B rotates a predetermined range about the spindle fitted into the cylindrical portion 41b1.

The roller portion 41b2 is pushed by a set lever not illustrated. The roller portion 41b2 is pushed by the set lever to rotate the trailing blades-drive lever 40B about the cylindrical portion 41b1.

The drive pin 41b8 extends downwardly from the base portion 41b. The drive pin 41b8 is fitted into a hole formed in the drive arm 32b.

A support portion 42b is provided on the base portion 41b. The support portion 42b is provided for supporting an iron piece 46b. The iron piece 46b is adsorbed to the electromagnet 70B. The iron piece 46b is coupled to a spindle portion 45b. The spindle portion 45b is made of a metal. The iron piece 46b is formed into a rectangular shape with a given thickness. The support portion 42b includes: guide portions 43b and 44b along the side of the iron piece 46b. The guide portions 43b and 44b restricts the iron piece 46b from rotating about the spindle portion 45b.

A second biasing member 49b is inserted between the guide portion 43b and the iron piece 46b. The second biasing member 49b is an elastically deformable spring with a plate shape. The second biasing member 49b includes: a base portion 49b1 extending linearly along the side surface of the iron piece 46b; and an engagement portion 49b2 continuous with the upper end of the base portion 49b1 and having an L shape when viewed from its side. The engagement portion 49b2 engages the support portion 42b and is held thereby. The second biasing members 49b is provided for biasing the iron piece 46b in a given direction. This will be described below in detail.

Figure 5:
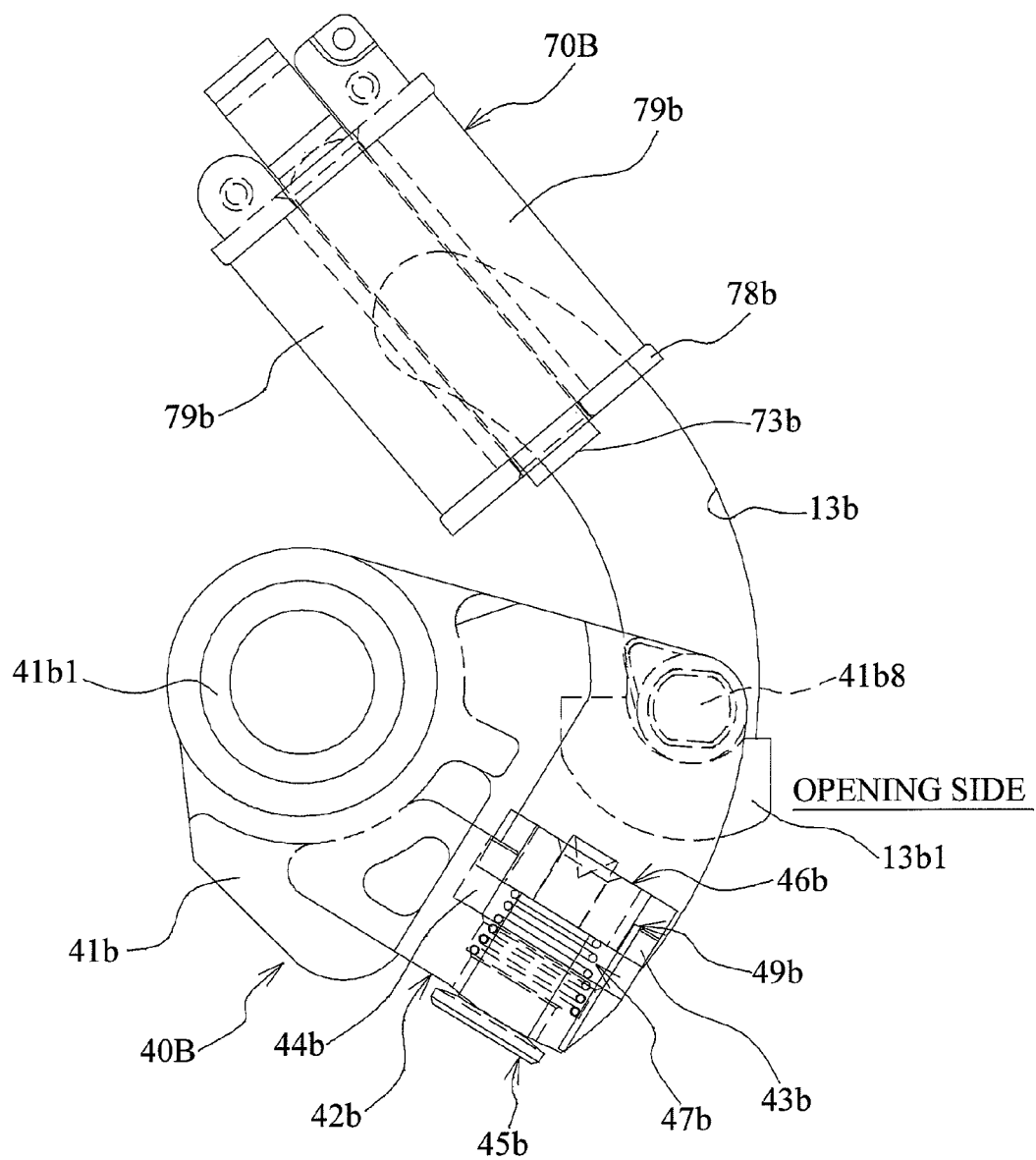
FIG. 5 is an explanatory view of an operation of the trailing blades-drive lever.
Figure 6:
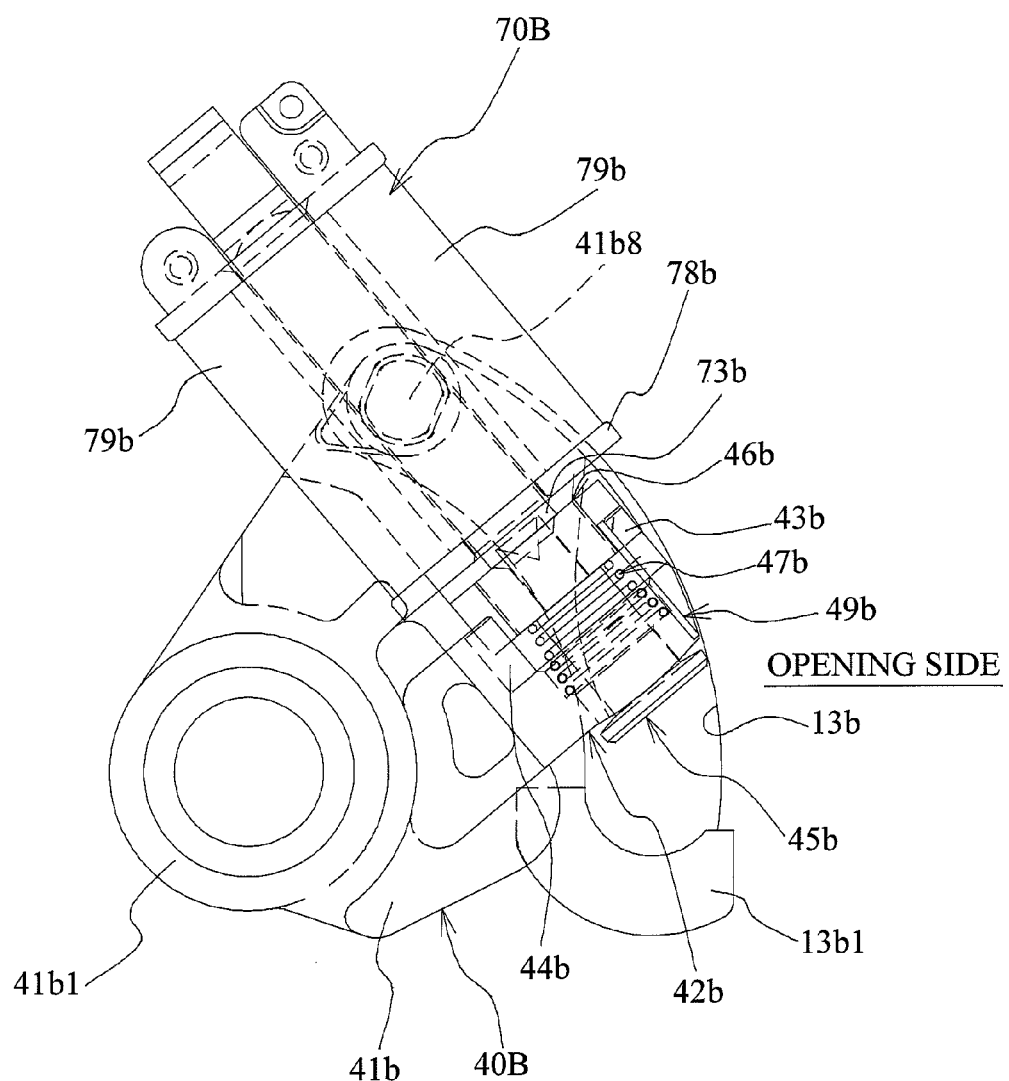
FIG. 6 is an explanatory view of the operation of the trailing blades-drive lever.

Next, an operation of the trailing blades-drive lever 40B will be described. FIGS. 5 and 6 are explanatory viewed of the operation of the trailing blades-drive lever 40B. The structure of the trailing blades-drive lever 40B is partially omitted in FIGS. 5 and 6. FIG. 5 illustrates a state where the trailing blades-drive lever 40B is spaced apart from the electromagnet 70B. FIG. 6 illustrates a state where the iron piece 46b of the trailing blades-drive lever 40B is adsorbed to the electromagnet 70B. The opening 11 is located in the right side of the trailing blades-drive lever 40B in FIGS. 5 and 6.

The board 10 is formed with an arc-shaped slot 13b for escaping the movement of the drive pin 41b8. Also, the slot 13b is provided at its one end portion with a rubber 13b1 for preventing the drive pin 41b8 from bounding. The electromagnet 70B includes: an iron core 73b; a coil 79b for exciting the iron core 73b; and a bobbin 78b around which the coil 79b is wound. The energization of the coil 79b generates the magnetic attraction force in the iron core 73b.

The trailing blades-drive lever 40B is rotated about the cylindrical portion 41b1 counterclockwise by the set lever from a state illustrated in FIG. 5. Therefore, the drive pin 41b8 moves within the slot 13b and then the iron piece 46b abuts the iron core 73b. Afterward, the coil 79b is energized, and then the iron piece 46b is adsorbed to the iron core 73b. As long as the coil 79b is energized even after the set lever recedes, the iron piece 46b is continuously adsorbed to the iron core 73b. When the energization of the coil 79b is stopped, the magnetic attraction force generated between the iron piece 46b and the iron core 73b disappears, and then the trailing-blades drive lever 40B is rotated clockwise by the biasing force of the spring not illustrated. The trailing blades-drive lever 40B is operated in such a way.

Figure 7:
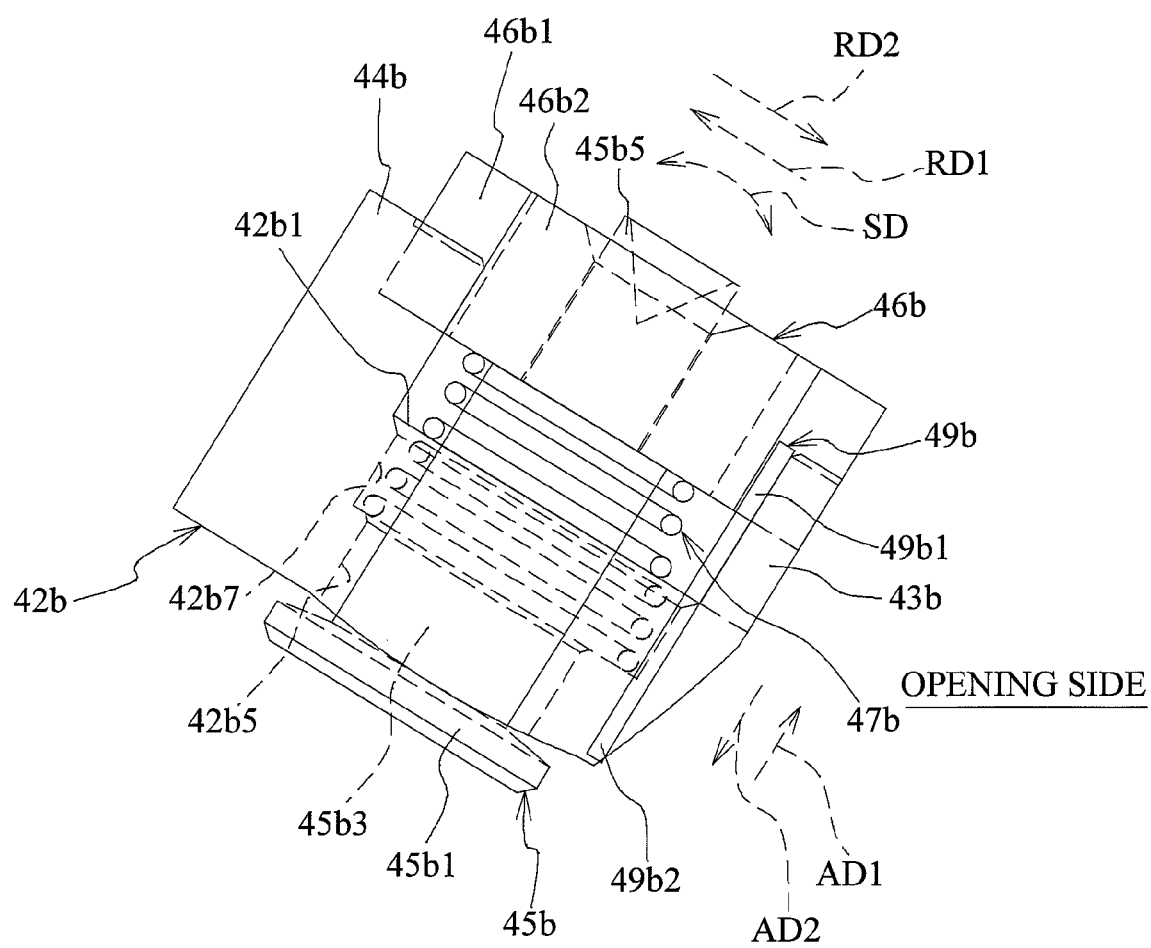
FIG. 7 is an enlarged view around an iron piece.
Figure 8:
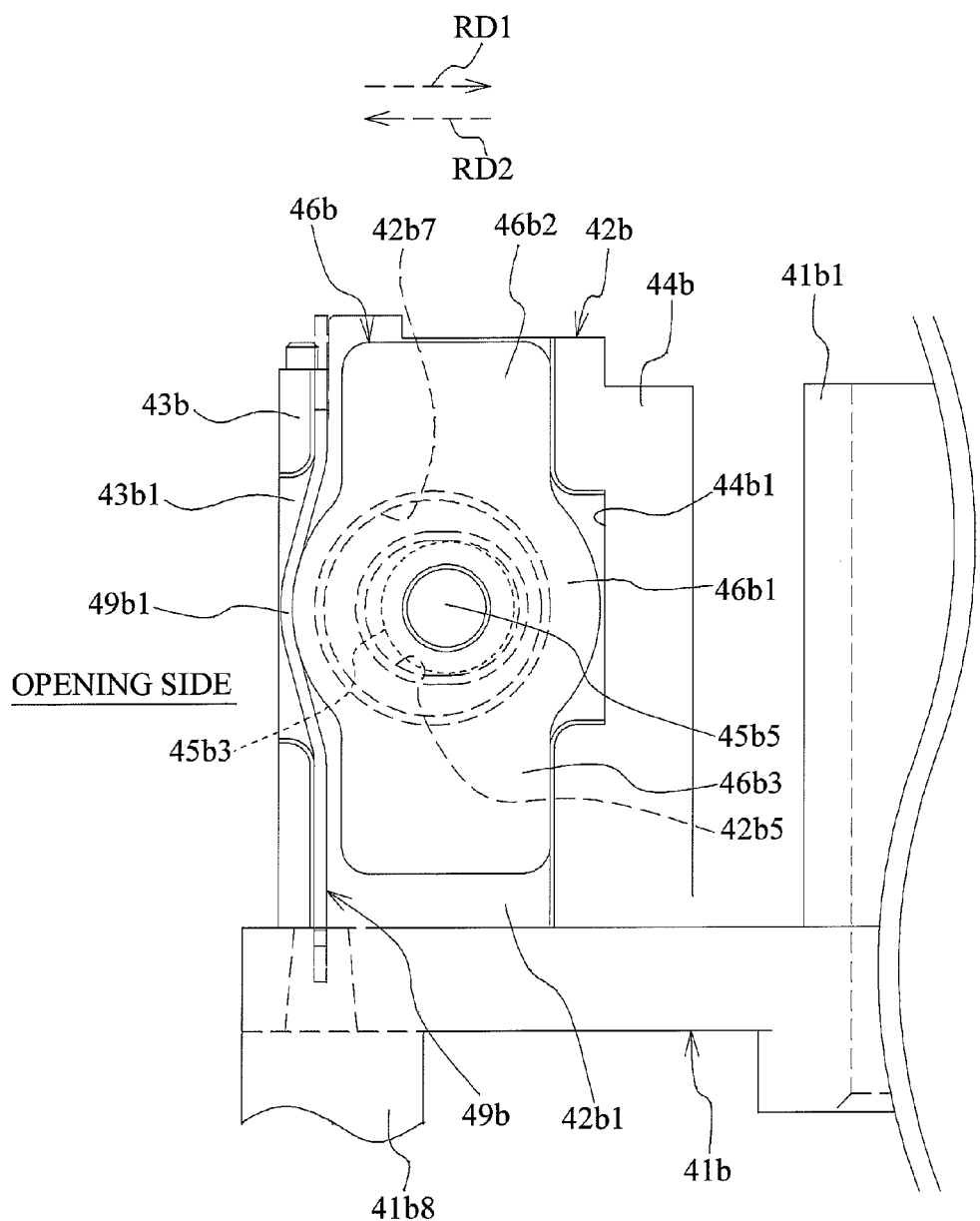
FIG. 8 is an enlarged view around the iron piece.

Next, the trailing blades-drive lever 40B will be described in detail. FIGS. 7 and 8 are enlarged views around the iron piece 46b. Additionally, the structure of the trailing blades-drive lever 40B is partially omitted in FIGS. 7 and 8. As illustrated in FIG. 7, the spindle portion 45b includes: a flange portion 45b1; a body portion 45b3 continuous with the flange portion 45b1 and having a diameter smaller than that of the flange portion 45b1; and a fitting portion 45b5 continuous with the body portion 45b3 and having a diameter smaller than that of the body portion 45b3. In other words, the flange portion 45b1 is formed at one end of the spindle portion 45b, and the fitting portion 45b5 is formed at the other end of the spindle portion 45b. The fitting portion 45b5 is fitted into the iron piece 46b. Therefore, the spindle portion 45b and the iron piece 46b are coupled with each other as an integral part.

The support portion 42b is formed with through-holes 42b5 and 42b7 through which the spindle portion 45b penetrates. The through-holes 42b5 and 42b7 are continuous with each other as a single hole. The through-hole 42b5 is smaller than the through-hole 42b7 in the radial direction. The diameter of the flange portion 45b1 is larger than that of the through-hole 42b5. Also, the support portion 42b includes a facing surface 42b1 facing the rear surface of the iron piece 46b as illustrated in FIG. 7. The through-hole 42b7 is formed in the facing surface 42b1.

A first biasing member 47b is provided between the support portion 42b and the iron piece 46b. The first biasing member 47b is a spring with a coil shape. The body portion 45b3 of the spindle portion 45b is inserted into the first biasing member 47b. The first biasing member 47b has a conical shape as a whole as illustrated in FIG. 7. The diameter of a part of the first biasing member 47b corresponding to a bottom of the conical shape is larger than the diameter of the through-hole 42b5. Also, the first biasing member 47b is partially arranged within the through-hole 42b7. The first biasing member 47b biases the iron piece 46b toward the axial direction AD1 of the spindle portion 45b.

A play is provided between the iron piece 46b and the facing surface 42b1. That is, the iron piece 46b is pushed against the biasing force of the first biasing member 47b in the axial direction AD2, whereby the iron piece 46b is movable until the rear surface of the iron piece 46b abuts the facing surface 42b1. Additionally, at this time, the spindle portion 45b moves together with the iron piece 46b in the axial direction AD2. The axial direction AD2 is opposite to the axial direction AD1.

As described above, the iron piece 46b is supported for reciprocation in a given range in the axial directions AD1 and AD2 and biased in the axial direction AD1. Accordingly even when the trailing blades-drive lever 40B rotates and the iron piece 46b abuts the iron core 73b, the trailing blades-drive lever 40B can further rotate through a degree where the iron piece 46b is capable of reciprocating. In such a way, the trailing blades-drive lever 40B is set to be further rotatable even when the iron piece 46b abuts the iron core 73b. This is because it is necessary to absorb the variation in the positional accuracy of the iron piece 46b or the iron core 73b occurring at every product and rotate the trailing blades-drive lever 40B until the iron piece 46b abuts the iron core 73b with certainty.

As illustrated in FIG. 8, the iron piece 46b includes a central portion 46b1 formed with a hole into which the fitting portion 45b5 is fitted; and end portions 46b2 and 46b3 extending from the central portion 46b1 in the opposite directions, respectively. The side surface of the central portion 46b1 has an arc shape when the iron piece 46b is viewed from its front side. The width of the central portion 46b1 is larger than each width of the end portions 46b2 and 46b3.

The guide portion 44b is formed with a depressed portion 44b1 for escaping the arc-shaped side surface of the central portion 46b1. Likewise, the guide portion 43b is formed with a cutout portion 43b1 for escaping the arc-shaped side surface of the central portion 46b1.

The second biasing member 49b is provided between the guide portion 43b and the iron piece 46b. The base portion 49b1 of the second biasing member 49b partially abuts the side surface of the central portion 46b1 as illustrated in FIG. 8. Thus, the base portion 49b1 is bent along the side surface of the central portion 46b1. The second biasing member 49b is deformed in such a way, thereby biasing the iron piece 46b in the radial direction RD1. The radial direction RD1 intersects the axial directions AD1 and AD2 and is generally perpendicular thereto. In other words, the radial direction RD1 is a direction toward the rotation center of the trailing blades-drive lever 40B. Also, the iron piece 46b is supported for movement in the radial direction RD1 and the radial direction RD2 opposite to the radial direction RD1 as described later. The radial directions RD1 and RD2 are directions included in the virtual plane in which the trailing blades-drive lever 40B rotates.

The iron piece 46b is biased in the radial direction RD1 by the second biasing member 49b, whereby the iron piece 46b is urged against the guide portion 44b. Specifically, the side surfaces of the end portions 46b2 and 46b3 abut the guide portion 44b, and the side surface of the central portion 46b1 does not abut the guide portion 44b.

Also, the through-hole 42b5 of the support portion 42b through which the body portion 45b3 of the spindle portion 45b penetrates has a shape extending slightly in the radial directions RD1 and RD2 as illustrated in FIG. 8. For this reason, there is a play between the body portion 45b3 and the through-hole 42b5 to some extent in the radial directions RD1 and RD2. Therefore, the iron piece 46b is movable in a given range in the radial directions RD1 and RD2. Also, the posture of the body portion 45b3 is changed within the through-hole 42b5, and then the body portion 45b3 inclines relative to the axial direction of the through-hole 42b5. Therefore, the iron piece 46b is swingable in the direction SD. Moreover, the direction SD is a direction included in the virtual plane in which the trailing blades-drive lever 40B rotates.

The following is the reason why the iron pieces 46b is movably supported in the radial directions RD1 and RD2 and the directions SD in such a way. The trailing blades-drive lever 40B rotates about a given point. For this reason, the iron piece 46b moves over an arc-shaped trajectory to abut the iron core 73b. When it is assumed to support the iron piece 46b not to move in the radial directions RD1 and RD2 and the direction SD, abutment surfaces of the iron piece 46b and the iron core 73b might not be parallel with each other depending on the positional accuracy of the iron piece 46b or the iron core 73b when they abut each other. Thus, both of the iron piece 46b and the iron core 73b might not closely abut each other and do not to ensure the attraction force between them.

However, the iron piece 46b is supported for movement in the radial directions RD1 and RD2 and the direction SD, whereby the iron piece 46b is moved such that the abutment surfaces of the iron piece 46b and the iron core 73b closely abut each other when they abut each other. Therefore the iron piece 46b and the iron core 73b can be made to closely abut each other without being influenced by their positional accuracies.

In cases where the iron piece 46b is supported for movement in the radial directions RD1 and RD2 and the direction SD, the posture of the iron piece 46b might not be maintained constant. For example, this occurs when the trailing blades-drive lever 40B reciprocates for a short period. In cases where the posture of the iron piece 46b cannot be maintained constant, the posture of the iron piece 46b cannot be also maintained constant when the iron piece 46b abuts the iron core 73b. This might generate variations in the positional relationship between the iron piece 46b and the iron core 73b when they abut each other.

However, the iron piece 46b is biased not only in the axial direction AD1 but also in the radial direction RD1 intersecting the axial direction AD1 such that the iron piece 46b is urged against the guide portion 44b, in the focal plane shutter 1 according to the present embodiment. Therefore, the iron piece 46b is held to be sandwiched between the guide portion 44b and the second biasing member 49b, thereby maintaining the posture of the iron piece 46b constant. Even when the trailing blades-drive lever 40B reciprocates for a short period, the posture of the iron piece 46b can be maintained constant.

This can maintain the posture of the iron piece 46b substantially constant when the iron piece 46b abuts the iron core 73b. Thus, the positional relationship between the iron piece 46b and the iron core 73b can be generally maintained constant while the iron piece 46b is being adsorbed to the iron core 73b. This can maintain the constant timing when the iron piece 46b is moved away from the electromagnet 70B after the energization thereof is stopped.

This also can prevent rattling of the iron piece 46b. This can reduce the operation noise. Further, the ratting of the iron piece 46b can be prevented, thereby preventing dusts from being generated by chipping the guide portion 43b, 44b, or the through-hole 42b5 due to the rattling.

The second biasing member 49b is positioned between the spindle portion 45b and the opening 11 as illustrated in FIGS. 7 and 8. Therefore, even if the guide portion 43b, 44b, or the through-hole 42b5 is chipped to generate dusts, it is possible to prevent the dusts from scattering toward the opening 11 while the trailing blades-drive lever 40B is reciprocating. This also prevents the image quality from being degraded.

Since the second biasing member 49b has a plate shape, the miniaturization of the trailing blades-drive lever 40B is achieved. Also, since the iron piece 46b is urged against the guide portion 44b, the iron piece 46b is prevented from rotating about the axis of the spindle portion 45b.

Figure 9:
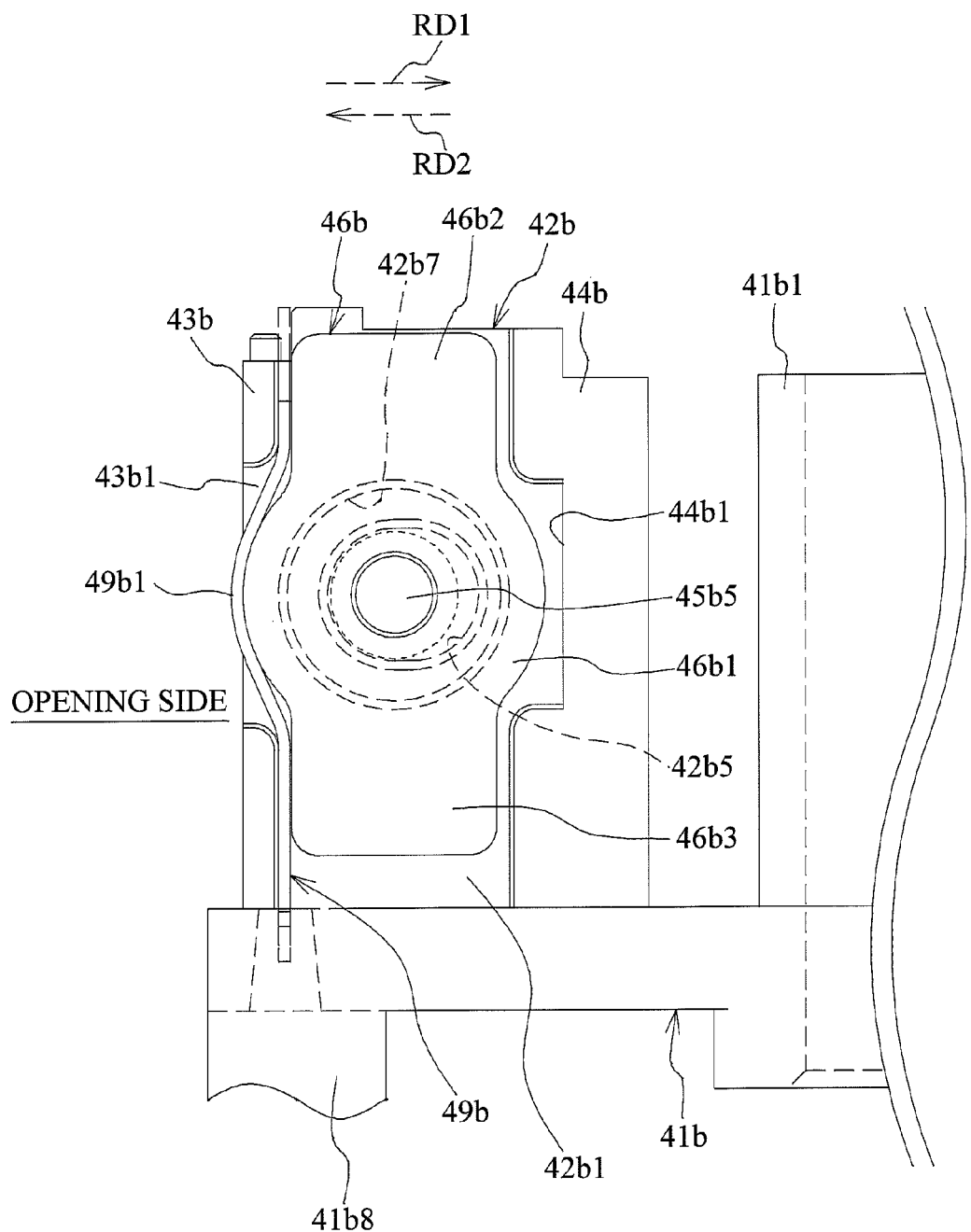
FIG. 9 is a view of a state in which the iron piece is moved in a radial direction opposite to a direction in which the iron piece is biased by a second biasing member.

FIG. 9 illustrates a state where the iron piece 46b moves in the radial direction RD2 opposite to the direction in which the second biasing member 49b biases the iron piece 46b. When the iron piece 46b abuts the iron core 73b or any impact is applied to the iron piece 46b, a force might be applied to the iron piece 46b in the radial direction RD2. In such a case, the side surfaces of the end portions 46b2 and 46b3 move away from the guide portion 44b, and then the central portion 46b1 of the iron piece 46b moves and pushes the base portion 49b1.

The base portion 49b1 is further bent by the force applied to the iron piece 46b in the radial direction RD2, and then extends from the cutout portion 43b1 to the outside. The iron piece 46b is permitted to move in the radial direction RD2 in such a way.

While the exemplary embodiments of the present invention have been illustrated in detail, the present invention is not limited to the above-mentioned embodiments, and other embodiments, variations and modifications may be made without departing from the scope of the present invention.

Although the blade having a thin shape and made of a synthetic resin has been described in the present embodiment, the blade having the thin shape may be made of a metal. Further, although the spring having a plate shape has been described as an example of the second biasing member, a spring having a coil shape may be employed. Although the example of biasing the iron piece 46b in the radial direction RD1 has been described, the iron piece 46b may be biased in the radial direction RD2.

The focal plane shutter according to the present embodiment can be employed in an optical device such as a still camera or a digital camera.

Finally, several aspects of the present invention are summarized as follows.

According to an aspect of the present invention, there is provided a focal plane shutter including an electromagnet; a board including an opening; a blade movable between a position where the blade recedes from the opening and a position where the blade covers at least part of the opening; and a drive lever driving the blade, and including: a spindle portion provided at its one end with a flange portion; an iron piece provided at the other end of the spindle portion and capable of being adsorbed to the electromagnet; a support portion including a through hole through which the spindle portion penetrates with a play; and a guide portion provided along the iron piece, wherein the drive lever includes: a first biasing member biasing the iron piece in an axial direction of the spindle portion; and a second biasing member biasing the iron piece in a direction intersecting the axial direction such that the iron piece is urged against the guide portion.

Since the iron piece is biased not only in the axial direction of the spindle portion but also in the direction intersecting the axial direction to be urged against the guide portion, the posture of the iron piece can be maintained constant. This can maintain the timing constant when the iron piece moves away from the electromagnet after the energization of the electromagnet is stopped. Accordingly, this can suppress the variation in the timing when the blade drives.

According to another aspect of the present invention, there is provided an optical device including the above focal plane shutter.

What is claimed is:

1. A focal plane shutter comprising:
   an electromagnet;
   a board including an opening;
   a blade movable between a position where the blade recedes from the opening and a position where the blade covers at least part of the opening; and
   a drive lever driving the blade, and including:
      a spindle portion provided at its one end with a flange portion;
      an iron piece provided at the other end of the spindle portion and capable of being adsorbed to the electromagnet;
      a support portion including a through hole through which the spindle portion penetrates with a play; and
      a guide portion provided along the iron piece, wherein the drive lever includes:
- a first biasing member biasing the iron piece in an axial direction of the spindle portion; and
- a second biasing member biasing the iron piece in a direction intersecting the axial direction such that the iron piece is urged against the guide portion; and
- wherein the second biasing member does not contact the spindle portion.

2. The focal plane shutter of claim 1, wherein the second biasing member has a plate shape.

3. The focal plan shutter of claim 2, wherein the second biasing member is positioned between the spindle portion and the opening.

4. An optical device comprising a focal plane shutter, the focal plane shutter including:
- an electromagnet;
- a board including an opening;
- a blade movable between a position where the blade recedes from the opening and a position where the blade covers at least part of the opening; and
- a drive lever driving the blade, and including:
  - a spindle portion provided at its one end with a flange portion;
  - an iron piece provided at the other end of the spindle portion and capable of being adsorbed to the electromagnet;
  - a support portion including a through hole through which the spindle portion penetrates with a play; and
  - a guide portion provided along the iron piece,
wherein the drive lever includes:
a first biasing member biasing the iron piece in an axial direction of the spindle portion; and
a second biasing member biasing the iron piece in a direction intersecting the axial direction such that the iron piece is urged against the guide portion; and
wherein the second biasing member does not contact the spindle portion.

* * * * *